US007729787B2

(12) United States Patent
Okabayashi et al.

(10) Patent No.: US 7,729,787 B2
(45) Date of Patent: Jun. 1, 2010

(54) EVENT DATA REPRODUCING APPARATUS AND METHOD, AND PROGRAM THEREFOR

(75) Inventors: Masaaki Okabayashi, Hamakita (JP); Kotaro Terada, Hamamatsu (JP); Fumiaki Tsukazaki, Shijonawate (JP)

(73) Assignee: Yamaha Corporation, Hamamatsu-shi (JP)

( * ) Notice: Subject to any disclaimer, the term of this patent is extended or adjusted under 35 U.S.C. 154(b) by 1468 days.

(21) Appl. No.: 11/064,664

(22) Filed: Feb. 23, 2005

(65) Prior Publication Data

US 2005/0283678 A1 Dec. 22, 2005

(30) Foreign Application Priority Data

Feb. 24, 2004 (JP) ............................ 2004-047702
Feb. 24, 2004 (JP) ............................ 2004-047708

(51) Int. Cl.
*G06F 19/00* (2006.01)

(52) U.S. Cl. ........................... 700/19; 700/27; 709/205

(58) Field of Classification Search .................. 700/19, 700/65, 9; 318/139, 376; 718/103; 712/220; 370/252; 709/205

See application file for complete search history.

(56) References Cited

U.S. PATENT DOCUMENTS 7,039,472 B2 5/2006 Sugimoto et al.
2004/0070620 A1* 4/2004 Fujisawa .................... 345/764
2004/0070621 A1* 4/2004 Suzuki et al. ............... 345/764
2009/0180395 A1* 7/2009 Wood et al. ................. 370/252

FOREIGN PATENT DOCUMENTS

JP 2002-157391 5/2002

OTHER PUBLICATIONS

TC Event (Time Code Event), MIDI/GPI/TC function, pp. 33-35, Yamaha Corporation.
Digital Production Console, DM 2000 Owner's Manual, Yamaha Corporation.

* cited by examiner

*Primary Examiner*—Kidest Bahta
(74) *Attorney, Agent, or Firm*—Morrison & Foerster LLP

(57) ABSTRACT

In sequence data composed of a plurality of event sets with their execution sequence predefined, each of the event sets includes event data indicative of an event to be executed and trigger data defining timing for executing the event. Once a user manually instructs progression instructing operation while the individual events are being executed in accordance with the timing defined by the corresponding trigger data, the next event is executed immediately even before arrival of the next event execution timing. According to another aspect, the trigger data include trigger data of a first type that defines the event execution timing the event by use of an absolute time and trigger data of a second type that defines the event execution timing by use of a relative time between the events, and the sequence data may mixedly include the trigger data of the first and second types. Any one of the two time information can be used appropriately in accordance with characteristics of the individual events. For example, for one event having close relevancy to another event to be executed earlier than the one event, the relative time information is used.

28 Claims, 6 Drawing Sheets

| SETTING CONDITION | | PROCESS | | | |
|---|---|---|---|---|---|
| EVENT TRIGGER | TC | AFTER RECALL | TC RECALL | SELECTIVE MOVEMENT ON LIST | MANUAL RECALL |
| MANUAL | TC OFF | × | × | × | ○ |
| | TC ON | × | × | ○ | ○ |
| AUTO | TC OFF | ○ | × | × | ○ |
| | TC ON | ○ | ○ | ○ | ○ |

EVENT DATA REPRODUCING APPARATUS AND METHOD, AND PROGRAM THEREFOR

BACKGROUND OF THE INVENTION

The present invention relates to an improved event data reproducing apparatus and method suited for use, for example, in digital mixers, an electronic apparatus using the improved event data reproducing apparatus and/or method, and a computer program for the event data reproduction.

Recent digital mixers are provided with a function (so-called "scene recall function") of storing, in memory, parameter values set via faders, volume control operator members, etc., ON/OFF states of various buttons and other settings or setting states of the digital mixer as "scene data" and then reproducing the thus-stored settings (scene data) in response to one-touch operation by a user or human operator. Thus, by recording in advance mixing settings in various scene setting states, e.g. in theatrical performances, concerts and the like, the digital mixers allow necessary mixing settings (setting states) to be quickly reproduced.

Further, digital mixers employed particularly in production of video and music content are provided with a so-called "automix" function. Namely, in these digital mixers provided with the "automix" function, parameters, such as fader levels, panning and send levels of individual channels are recorded in advance as "automix data" in association with time codes. Then, once "automix data" to be reproduced is designated and the corresponding time codes are supplied to the mixer, the parameters are automatically set to values corresponding to the supplied time codes. In this way, fader levels etc. can be automatically set in synchronism with the time codes recorded together with materials, such as video/music data (see, for example, "DM2000 Instruction Manual", published by Yamaha Corporation in February, 2002, Pages 157-181.

In rehearsals of concerts and theatrical performances, the number of human operators of a digital mixer is sometimes less than that in a real (non-rehearsal) performance before the audience. If, in such a case, the scene recall function can be performed automatically, then it is possible to significantly lessen the burden of the human operators. Even during the real performance, part of the scene recall may sometimes be safely performed automatically. In such a case, once the "scene recall" is designated as an automix parameter, the scene recall can be effected automatically.

However, in actual concerts, theatrical performances, etc. before the audience, there may occur some time "deviations" from previously-estimated times, or needs to deal with unexpected events. Further, during rehearsals, "redoing", "skipping", etc. of some of the scenes occur frequently. With a technique where the "scene recall" is merely included as an automix parameter, it is practically impossible to deal with such unexpected events. This is because editing of the automix data is generally cumbersome and laborious and thus difficult to deal with instantly.

Further, when there have occurred changes in the recalling timing of a plurality of scenes under the above-mentioned circumstances, the conventional digital mixers would require the human operator to manually adjust all execution timing having changed. Consequently, the conventional digital mixers present the problem that the execution-timing editing operation tends to be very cumbersome. Further, when a particular scene has been recalled at given timing, the execution timing of one or more scenes following the particular scene is sometimes determined on the basis of respective time differences from the particular scene. In such a case, it should be very convenient if the execution timing of the other scenes can be automatically determined when the execution timing of the particular scene has been changed.

SUMMARY OF THE INVENTION

In view of the foregoing, it is an object of the present invention to provide an event data reproducing apparatus and method which can promptly deal with any unexpected change in execution timing while automatically executing events, such as a scene recall event, an electronic apparatus using the event data reproducing apparatus and/or method, and a computer program for the event data reproduction.

It is another object of the present invention to provide an event data reproducing apparatus and method which, when the execution timing of a given event has been changed, allow the execution timing of other events, having close relevancy to the given event, to follow the changed execution timing of the given event, an electronic apparatus using the event data reproducing apparatus and/or method, and a computer program for the event data reproduction.

According to a first aspect of the present invention, there is provided an improved event data reproducing apparatus, which comprises: a sequence data supply section that supplies sequence data including a plurality of event sets with their execution sequence predefined, each of the event sets including event data indicative of an event to be executed and trigger data defining timing for executing the event; a processing section that sequentially executes the event data of individual ones of the event sets, included in the sequence data, in accordance with the timing defined by the trigger data corresponding to the event data; an index section that indicates or indexes the event set of an execution position (i.e., timing) immediately following that of the event data last (i.e., most recently) executed by the processing section; an operation section operable by a user to perform progression instructing operation; and a control section that, in response to the progression instructing operation performed via the operation section, causes processing by the processing section to proceed so as to execute the event data of the event set currently indexed by the index section.

In the present invention, once the user manually instructs execution of the next event via the operation section while the individual events are being executed in accordance with the timing defined in the sequence data, the next event can be executed immediately even before arrival of the execution timing of the next event, so that the event sequence is caused to proceed in a manual manner. In this way, the event execution can be manually changed promptly in an appropriate manner during the execution of the sequence depending on a current situation, According to a second aspect of the present invention, there is provided another improved event data reproducing apparatus, which comprises: a sequence data supply section that supplies sequence data including a plurality of event sets with an execution sequence of the event sets predefined, each of the event sets including event data indicative of an event to be executed and trigger data defining timing for executing the event, the trigger data of the event sets including trigger data of a first type that defines the timing for executing the event by use of absolute time information and trigger data of a second type that defines the timing for executing the event by use of relative time information indicative of a time interval between the events, the sequence data being capable of mixedly including the trigger data of the first type and the second type; a processing section that sequentially executes the event data of the individual event sets, included in the sequence data, in accordance with the timing defined by the trigger data corresponding to the event data; and an index section that indexes the event set of an execution position immediately following that of the event data last executed by the processing section. Upon arrival of earlier one of the timing defined by the trigger data of the event set currently indexed by the index section and the timing defined by the trigger data of any of the event sets having an execution position following that of the event set currently indexed by the index section, the processing section executes the event data of the event set corresponding to the earlier timing having arrived.

Because the absolute time information and relative time information can be mixedly included, as data defining the trigger timing (execution timing) of the events, in the single sequencer data, any one of the two time information can be used appropriately in accordance with characteristics of the individual events. Thus, for one event data having close relevancy or relativity to other event data to be executed earlier than the one event data (i.e., next event data), the relative time information (trigger data of the second type) can be used, as the data defining the trigger timing, so that the next event can be executed reliably at timing closely related to the execution timing of the earlier event.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

1. Example Hardware Setup of Embodiment

Figure 1:
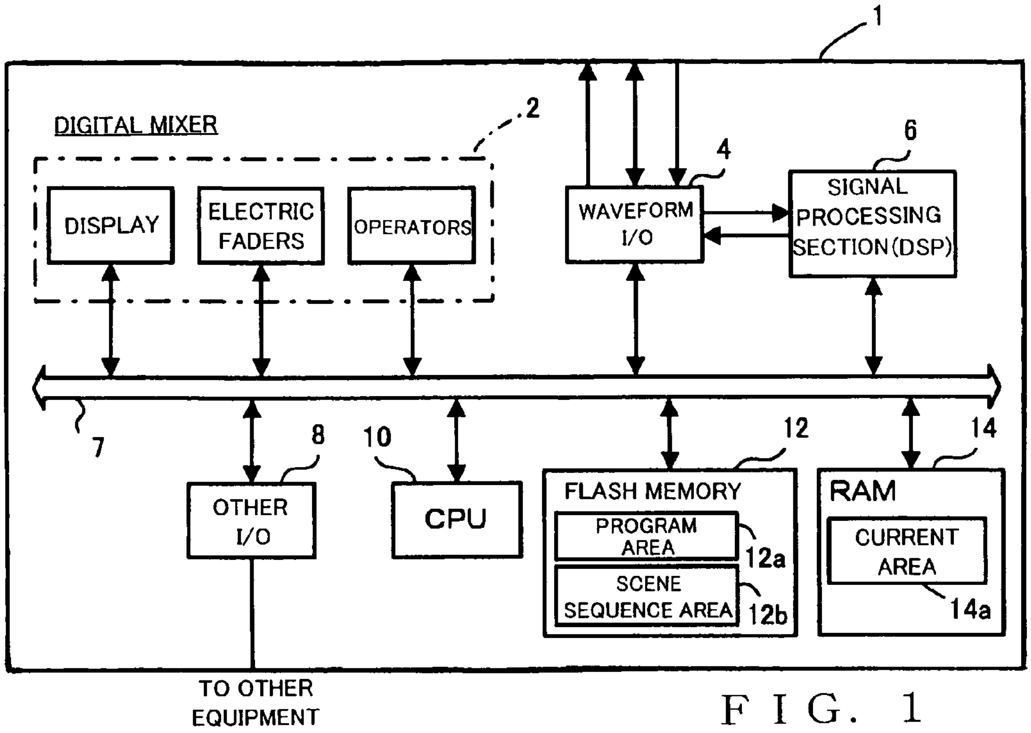
FIG. 1 is a block diagram showing an example general hardware setup of a digital mixer in accordance with an embodiment of the present invention.

A description will be made about an example general hardware setup of a digital mixer in accordance with an embodiment of the present invention, with reference to FIG. 1.

As shown, the digital mixer of the present invention includes an operation panel 2 that in turn includes various display devices and elements, operator members, etc. Among the "operator members" are electric faders, rotary encoders, buttons, etc. Once any one of the electric faders is operated by a user or human operator, the current operating state of the operated electric fader is output via a bus 7. Similarly, once any one of the rotary encoders and buttons is operated, the current operating state of the operated encoder or button is output via the bus 7. Mouse and keyboard of a personal computer can also be connected to the digital mixer of the present invention. Let it be assumed here that the mouse and keyboard of the personal computer are also included in the operator group of the operation panel 2 of the digital mixer.

When an operation command has been supplied via the bus 7 to any one of the electric faders, that electric fader is automatically set to a predetermined operating position. In contrast to the electric faders, the rotary encoders and buttons of the mixer are never automatically driven physically. Each of the buttons has an LED built therein and indicates its ON/OFF state by an ON/OFF (i.e., illuminated/deilluminated) state of the built-in LED. Further, there are provided display elements in the neighborhood of each of the rotary encoders, to indicate an operated amount of the rotary encoder. In some cases, the displaying states of these display elements may be automatically set via the bus 7.

Reference numeral 4 represents a waveform I/O section which inputs/outputs analog or digital audio or sound signals. In the instant embodiment, mixing processing, effect processing, etc. of various audio or sound signals (for convenience, hereinafter referred to as "sound signals") are all carried out in a digital manner. However, in many cases, sound signals input to the digital mixer from the outside and sound signals to be output to the outside are in analog representation. Therefore, in the waveform I/O section 4, any desired one or more of cards having various functions, such as microphone-level analog input, line-level analog input, digital input, analog output and digital output functions, are inserted as necessary, and necessary conversion processes can be performed by these cards.

The digital mixer also includes a signal processing section 6 which is in the form of a group of DSPs (Digital Signal Processors). The signal processing section 6 performs mixing processing and effect processing on digital sound signals supplied via the waveform I/O section 4, and it outputs processed results to the waveform I/O section 4. Reference numeral 8 represents another or further I/O section, which transmits and receives time codes and other information to and from any of various external equipment. Reference numeral 10 represents a CPU, which controls various components of the digital mixer via the bus 7 on the basis of various control programs to be later described. Flash memory 12 includes a program area 12*a* where the above-mentioned control programs are stored. RAM 14 is used as a working memory for the CPU 10.

Note that a set of settings (i.e., setting states or set values) of the digital mixer, representing a given scenic situation, are herein referred to as a "scene". In the instant embodiment of the digital mixer, the contents of the current "scene" are stored in a current area 14*a* within the RAM 14. Once the human operator performs predetermined operation, the stored contents of the current area 14*a* are transferred, as "scene data", into a scene sequence area 12*b* of the flash memory 12 or other storage device, as appropriate. The scene sequence area 12*b* is capable of storing a plurality of scene data, and thus, at the time of a scene switching on a stage or the like, the human operator allows a necessary scene to be reproduced (i.e., recalled) in the current area 14*a* through his or her one-touch operation. In the scene sequence area 12*b*, there are also stored sequence data to be used for automatically executing the scene recall on the basis of time codes etc.

2. Organization of Data Employed in Embodiment

Figures 4, 7:
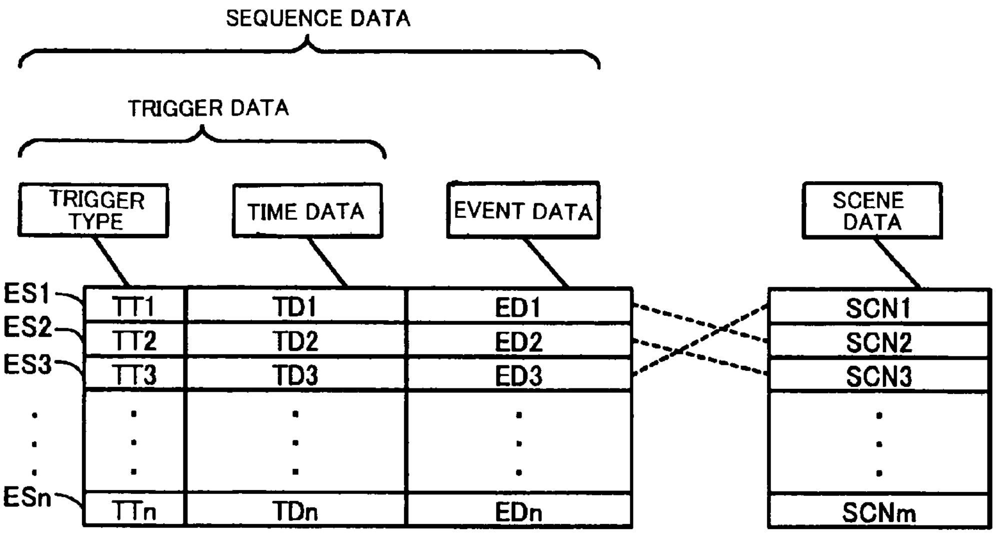
FIG. 4 is a diagram showing sequence data and an example organization of the sequence data in the digital mixer.
FIG. 7 is a diagram explanatory of behavior of the digital mixer.

The following paragraphs describe an example data organization in the scene sequence area 12*b*, with reference to FIG. 4.

In the figure, SCN1-SCNm represent "m" scene data, and, in each of the scene data, there are recorded settings (i.e., set values) to be reproduced for parameters to be recalled. Each of the scene data comprises event sets ES1-ESn defining the contents of "n" events. Here, each of the event sets ESk (k is an arbitrary value in the range of 1−n) comprises a trigger type TTk, time data TDk and event data EDk, and the trigger type TTk and time data TDk will be collectively referred to as "trigger data".

In the event data EDk, there is recorded a pointer to any one of the scene data SCN1-SCNm which is to be recalled in the event in question. However, in case no scene is assigned to the event set ESk in question, "no-assign" data is recorded in the event data EDk. The trigger data is intended to set a trigger for executing recall of the scene. The following three types of triggers are employed in the instant embodiment:

"Time code type": This type of trigger data is intended to execute desired scene recall when a time code generated within the digital mixer or supplied from outside the digital mixer (internal time code or external time code) has reached a predetermined time value;

"After type": This type of trigger data is intended to execute desired scene recall upon lapse of a predetermined time after execution of the immediately-preceding event set ES(k−1); and "Manual type": This type of trigger data is intended to execute desired scene recall only in response to predetermined manual operation performed by the human operator, instead of performing the scene recall automatically.

The above-mentioned trigger type TTk designates a particular trigger to be applied from among the above-mentioned three types of triggers. When the trigger type TTk is the "time code type", it is necessary to set a time point at which the scene recall is to be executed. When the trigger type TTk is the "after type", it is necessary to set a relative waiting time after completion of the execution of the immediately-preceding event set ES(k−1). These time point and relative time are defined as the time data TDk. Further, when the trigger type TTk is the "manual type", the time data TDk is ignored.

Figure 3:
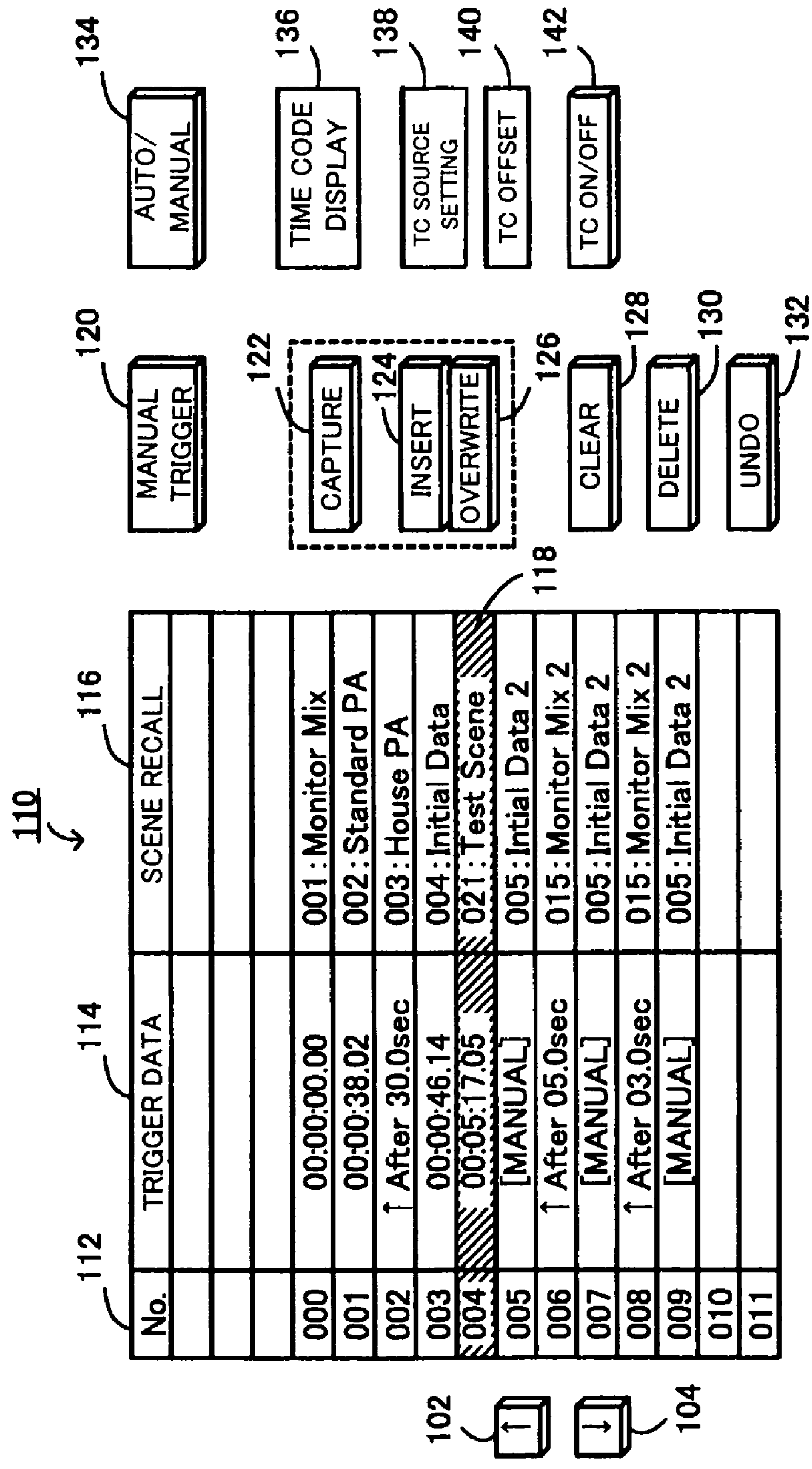
FIG. 3 is a diagram showing an event list editing screen displayed on a dot-matrix display section in the digital mixer.

3. Event List Editing Screen (FIG. 3)

Figure 2:
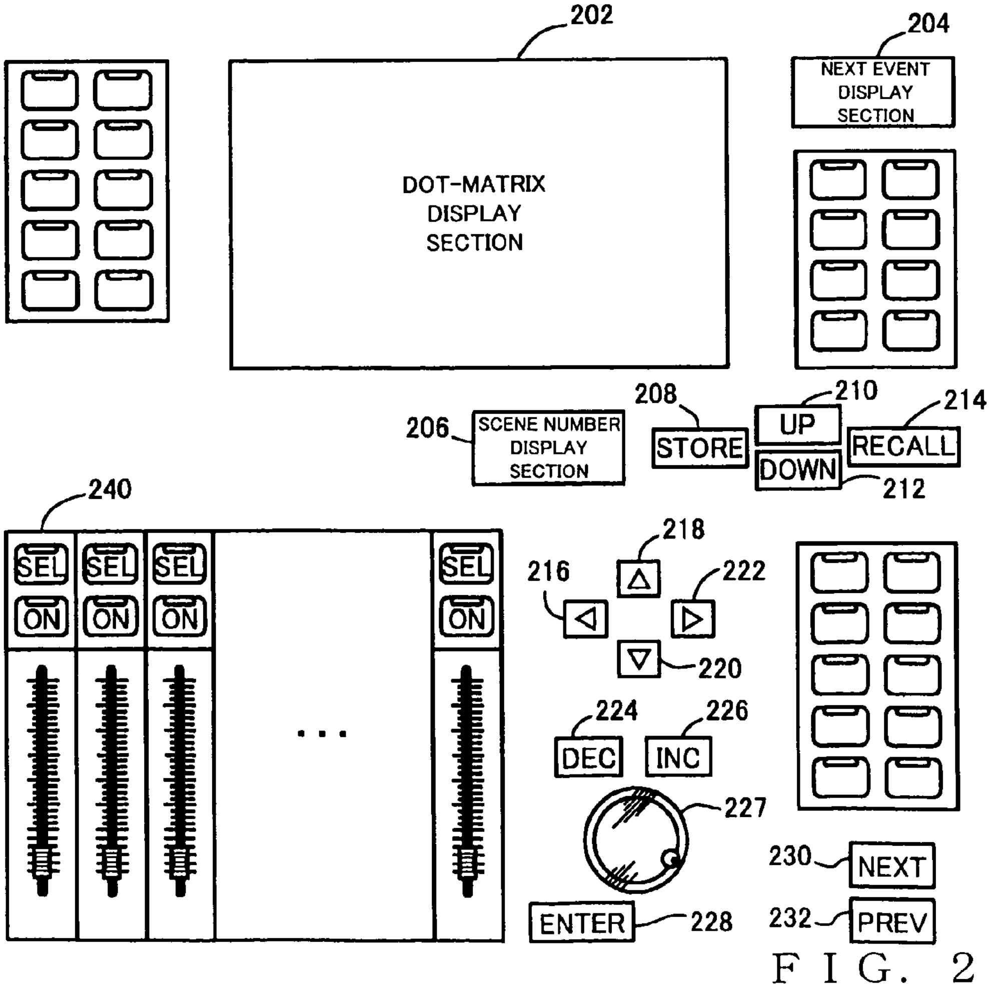
FIG. 2 is a plan view showing relevant sections of an operation panel in the digital mixer.

On the operation panel 2, there is provided a dot-matrix display section 202 as shown in FIG. 2. Once the human operator performs predetermined operation, an event list editing screen of FIG. 3 is displayed on the dot-matrix display section 202. In FIG. 3, reference numeral 110 represents an event list, where the details or contents of the event sets ES1-ESn are indicated in respective rows thereof. Further, in the event list 110, a sequence number display section 112 indicates an execution order sequence of the events in increasing numeric values.

Reference numeral 114 represents a trigger data display section, which indicates the contents of the trigger data of the individual event sets. The trigger type indicated in each row of an eight-digit numerical value, e.g. "00:00:38:02", is the "time code type", and the indicated eight-digit numerical value is a time code of execution timing indicated by a series of four units of time, i.e., in a "hour: minute: second: hundredth of second" format. The trigger type indicated in each row beginning with a combination of an upward arrow and letters "↑ After", e.g. "↑ After 30.0 sec", is the "after type", and the time value, such as "30.0 sec" following the "↑ After" combination represents a relative time until the event set is executed after completion of the execution of the immediately-preceding event set. Further, the trigger type indicated in each row of "MANUAL" is the "manual type".

Reference numeral 116 represents a scene display section, which indicates the "scene number" and "scene number" of the scene data to be recalled in the event set in question. Here, the scene number is a unique number assigned to each of the scene data, which is represented, in the illustrated example, by a three-digit numerical value, such as "001". Further, the scene name is a string of letters indicative of the contents of the scene data, which, in the illustrated example, is indicated following the scene number. 118 represents a cursor which highlights a row assigned or pertaining to an event set that immediately follows the last executed event set in the execution sequence. Note that the data of the trigger data display section 114 and scene display section 116 in the cursor-indicated (highlighted) row can be edited, as necessary, by the human operator. The thus-edited data is reflected directly in the sequence data and then the sequence data and contents of the event list 110 are sorted on the basis of time codes generated or supplied after the editing, as will be later detailed.

Further, in FIG. 3, reference numeral 134 represents an EVENT TRIGGER button, which switches between auto and manual "event trigger" modes each time it is clicked via the mouse. In the auto event trigger mode, scene recall of the event sets having the "time code type" and "after type" trigger data can be automatically performed on the basis of time codes received from the outside or generated internally in the digital mixer. In the manual event trigger mode, however, the scene recall of these event sets is not performed automatically.

When a MANUAL TRIGGER button 120 is clicked via the mouse, the event set specified in the row indicated (highlighted) by the cursor 118 in the event list 110 is executed irrespective of whether the event trigger mode is "auto" or "manual". 102 represents an UP button and 104 a DOWN button. These UP and DOWN buttons 102 and 104 are enabled only when the cursor 118 is located at the row of a "manual type" or "after type" event set (i.e., at a "manual type" or "after type" row) in the event list 110, and disabled when the cursor 118 is at a "time code type" row. While the cursor 118 is located at one of the rows that is assigned to or pertains to a data set of the "manual type", the cursor 118 itself is moved upward by one row when the UP button 102 has been clicked via the mouse, but moved downward by one row when the DOWN button 104 has been clicked via the mouse. In either case, the cursor 118 is repositioned at and highlights the row to which it has been moved (i.e., moved-to row).

Further, in the event list 110 of FIG. 3, the "manual type" row of sequence number "005" is followed by the "after type" row of sequence number "006". Where one "manual type" or "after type" row is followed by one or more "after type" rows as in the instance mentioned just above, and when the cursor-indicated row has been moved via the UP or DOWN button 102 or 104, the one or more "after type" rows are also moved in accordance with such movement of the cursor-indicated row. For instance, in the illustrated example of FIG. 3, once the UP button 102 is clicked via the mouse with the cursor 118 located at the "manual type" row of sequence number "005", the "manual type" and "after type" rows so far located at the positions of sequence numbers "005" and "006" are moved upward to the positions of sequence numbers "004" and "005", respectively, and the "time code type" row so far located at the position of sequence numbers "004" is moved downward to the position of sequence number "006".

Reference numeral 138 represents a TC (Time Code) source setting section, which selects, as the time code to be used, between the internal time code generated within the digital mixer and the external time code supplied from an external device. Time code display section 136 displays the time code selected via the TC source setting section 138. If the selected time code is the internal time code, the human operator can edit (increase or decrease the value of) the time code as necessary. TC offset setting section 140 is enabled only when the external time code is currently selected via the TC source setting section 138. The TC offset setting section 140 can set an offset value that is to be added to the externally-supplied time code, and the addition result (sum) is used as the time code for determining the execution timing of the event set. The addition result, rather than the externally-supplied time code itself, is displayed on the time code display section 136.

Reference numeral 142 represents a TC ON/OFF button that is operable to set a desired one of ON and OFF states of the time code. When the time code is ON, the event set whose trigger type is the "time code type" is automatically executed in accordance with progression of the time code, while, when the time code is OFF, no event set, except for the event set whose trigger type is the "after type", is automatically scene-recalled, as will be later described in greater detail.

Reference numeral 122 represents a CAPTURE button, which is switched between ON/OFF states each time it is clicked via the mouse. Once the human operator performs the scene recall operation via the RECALL button 214 while the CAPTURE button 122 is ON and the TC ON/OFF button 142 is ON (i.e., when the internal time codes are being generated or the external time codes are being received) as will be later detailed, the event set corresponding to the recalled scene is inserted into the sequence data. The thus-inserted event set is of the "time code type", and the time data thereof is one obtained at the time of the recall operation. Then, a pointer to the recalled scene data is recorded as the event data EDk.

The CAPTURE button 122 is kept enabled irrespective of whether the event trigger mode is "auto" or "manual". If the trigger type of the event set is the "time code type", i.e. if the TC ON/OFF button 142 is ON, the sequence data is automatically sorted in accordance with the order of the time codes, in response to which the inserted event set is also inserted into the displayed event list 110 and the row assigned to the inserted event set is highlighted by the cursor 118, i.e. becomes a cursor-indicated row On the other hand, once the human operator performs the scene recall operation while the time code is OFF, a new event set is added to the position of the current cursor-indicated row. Pointer to the recalled scene data is recorded into the added event set, and the trigger type is set to the "manual type". In the following description, let it be assumed, unless stated otherwise, that, once the sequence data is edited, each event set located in the edited portion, whose trigger type is the "time code type", is automatically sorted, and that, once a change has occurred in the sequence data through editing, the result of the change is immediately reflected in the event list 110 as well.

Reference numeral 124 represents an INSERT button, and, once this INSERT button 124 is clicked via the mouse with the TC ON/OFF button 142 in the ON state, the current time code is captured, so that a new event set, whose trigger type TTk is the "time code type" and which has the captured time code as its time data TDk, is inserted in the sequence data. The event data in this event set is set to "no-assign".

Reference numeral 126 represents an OVERWRITE button, and once this OVERWRITE button 126 is clicked via the mouse with the TC ON/OFF button 142 in the ON state, the current time code is captured, the trigger type of the event set in the current cursor-indicated row is set to the "time code type", and the time data is changed to, or replaced with, the captured time code. Note that the event data is not changed in this case.

Reference numeral 128 represents a CLEAR button, and once this CLEAR button 128 is clicked via the mouse, the trigger type of the event set in the current cursor-indicated row is set to the "manual type", and the event data in this event set is set to "no-assign". 130 represents a DELETE button, and once this DELETE button 130 is clicked via the mouse, the event set in the current cursor-indicated row is deleted. Once an UNDO button 132 is clicked via the mouse, the sequence data and event list 110 are each brought back to the last editing phase, i.e. one phase before the current editing state.

4. Construction of Relevant Sections of Operation Panel 2

Next, example construction of relevant sections of the operation panel 2 will be described with reference to FIG. 2. In the figure, the dot-matrix display section 202 graphically displays the above-mentioned event list editing screen (FIG. 3) and some of various settings of the digital mixer which have been selected by the human operator. 204 represents a next event display section, which, for the event set immediately following the last-executed event set in the execution sequence, displays the sequence number, trigger data and scene number and scene name of the scene to be recalled.

Further, in the instant embodiment, the scene recall can be executed not only on the basis of the time codes and sequence data as set forth above, but also in response to the human operator recalling a desired scene through predetermined manual operation. Scene number display section 206 displays the scene number of the scene to be recalled through such manual operation by the human operator. STORE button 208 is operable to store the current stored contents of the current area 14*a* into the scene sequence area 12*b* as new scene data. UP button 210 is operable to increment by one the scene number displayed on the scene number display section 206, and a DOWN button 212 is operable to decrement by one the displayed scene number. RECALL button 214 is operable to recall the scene represented by the scene number displayed on the scene number display section 206.

Reference numerals 216-220 represent cursor buttons, which are operable to move a mouse cursor, displayed on the dot-matrix display section 202, in vertical and horizontal (i.e., in FIG. 2, top-and-bottom and left-and-right) directions.

Namely, the mouse cursor can be moved not only in response to operation of the mouse, but also in response to operation of any of the cursor buttons 216-220. Reference numerals 224 and 226 represent DECREMENT and INCREMENT buttons, respectively, which are, for example, operable to decrement and increment the time code value displayed on the time code display section 136 and any one of other numerical values. Wheel 227 is rotatable by the human operator to increment or decrement any one of various numerical values in a similar manner to the buttons 224 and 226. ENTER button 228 is operable to confirm entry of the numerical value set via the wheel 227.

NEXT button 230 is operable to execute the event set in the cursor-indicated row of the event list 110 and move the cursor 118 downward by one row. PREV button 232 is operable to execute the event set located two rows above the cursor-indicated row (i.e., second preceding event set from the cursor-indicated row) and move the cursor 118 downward by one row (one row above the initial cursor-indicated row). Processes responsive to depression events of these NEXT button 230 and PREV button 232 will be later described in greater detail.

5. Behavior of Embodiment 5.1. Principal Event Processes:

Next, behavior of the instant embodiment will be described. Once the human operator performs predetermined operation, the event list editing screen of FIG. 3 is displayed on the dot-matrix display section 202. The following paragraphs describe principal event processes performed in the embodiment as various events occur in this state.

Figure 5A:
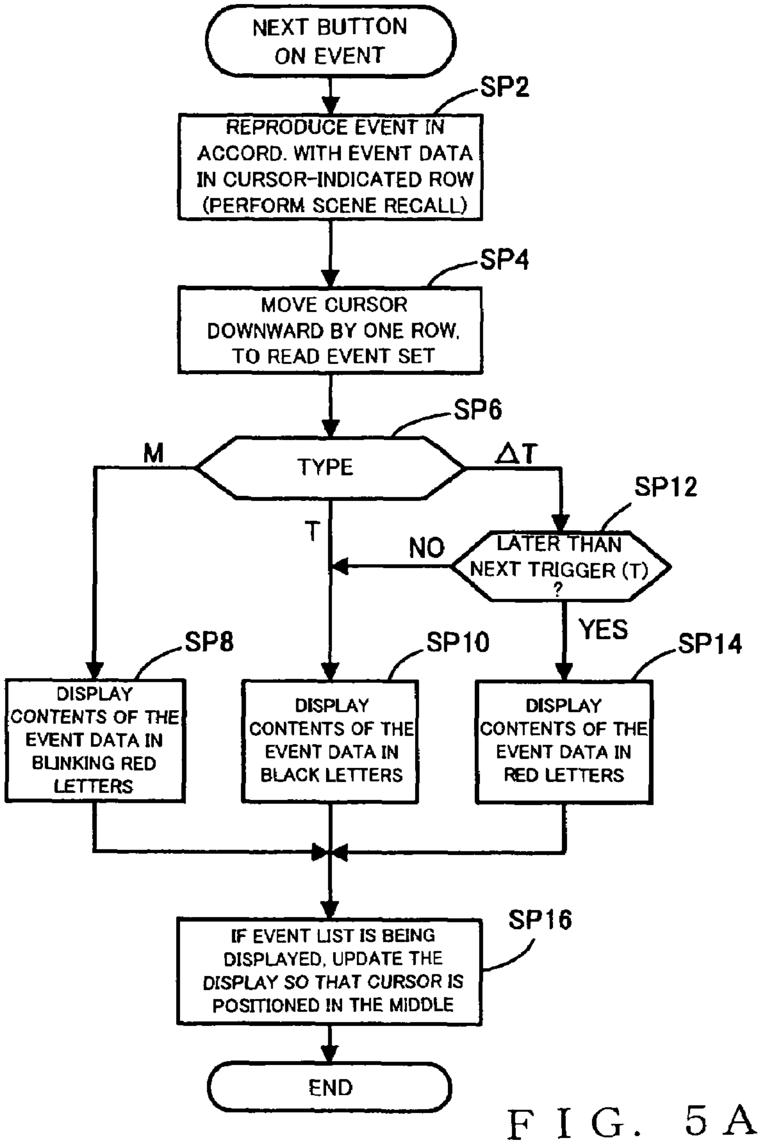
FIGS. 5A and 5B are flow charts of event process routines performed in response to operation of predetermined buttons in the digital mixer.

5.1.1. Depression Event of NEXT button 230:

Once the NEXT button 230 is depressed, a NEXT button ON event process routine of FIG. 5A is started up. At step SP2, the event data in the cursor-indicated row of the event list 110 is executed. Namely, scene recall of the event set in question is carried out. At next step SP4, the cursor 118 is moved downward by one row, so that the event set of the moved-to row, i.e. changed cursor-indicated row, is read out from the sequence data.

At following step SP6, the process branches variously on the basis of the trigger type determined. If the trigger type has been determined to be "the manual type", the process goes to step SP8, where the contents of the event set in question, i.e. the contents of the event set specified in the cursor-indicated row of the event list 110, are displayed on the next event display section 204 in "blinking red letters". This blinking display is intended to call the attention of the human operator, because the event set in question is not executed unless the human operator operates the MANUAL TRIGGER button 120 or NEXT button 230.

If the event set read out at step SP4 is of the "time code type" as determined at step SP4, the process goes to step SP10, where the contents of the event set is displayed on the next event display section 204 in normal "non-blinking black letters". If the cursor-indicated row is displayed in such normal "non-blinking black letters", it means that "the event set is scheduled to be automatically executed in accordance with the progression of the time code".

If the event set read out at step SP4 (hereinafter referred to as "event set A") is of the "after type" as determined at step SP6, the process goes to step SP12. Here, the current time code value and the time data of the event set A are added together to thereby determine an "estimated execution time" at which the event set A is to be executed. Then, a search is made through the sequence data for a first-appearing event set of the "time code type" among all event sets located below the cursor-indicated row (such a first event set of the "time code type" will hereinafter be referred to as "event set B"). At step SP12, a determination is made as to whether the estimated execution time of the event set A is later than the time represented by the time data value of the event set B.

With a YES determination at step SP12, the process proceeds to step SP14, where the contents of the event set in question are displayed on the next event display section 204 in "non-blinking red letters". As will be later detailed in connection with a time code input event process routine of FIG. 6A, the instant embodiment is arranged to not automatically execute event sets located in the rows above the current cursor-indicated row. Therefore, without any particular operation performed by the human operator, the event set B is then executed ahead of the event set A and the cursor 118 is moved to the row immediately following the row of the event set B, so that the event set A will not be executed. Because the event set A is not be executed in the absence of any particular operation by the human operator as noted above, step S14 is directed to issuing attention-calling information to that effect in "red letters".

With a NO determination at step SP12, the process proceeds to step SP10, where the contents of the event set in question is displayed on the next event display section 204 in "non-blinking black letters". In this case, the event set A is executed ahead of the event set B, followed by execution of the event set B. Upon completion of the operation at of steps SP6-SP14 above, the process moves on to step SP16, where the entire event list 110 is scrolled so that the cursor 118 is positioned in the middle of the event list 110. Then, the display style of the cursor-indicated row is set to agree with the earlier-set display style (one of the three styles: "blinking red letters"; "non-blinking red letters"; and "non-blinking blank letters") of the next event display section 204.

For example, once the NEXT button 230 is depressed under the conditions of FIG. 3, the event set of sequence number "004" is executed at step SP2, and the cursor 118 moves to the row of sequence number "005" at step SP4. Because the trigger type of the event set in this moved-to row is "manual", the cursor-indicated row is displayed in "blinking red letters" on the next event display section 204 and event list 110, at steps SP8 and SP16.

Figure 5B:
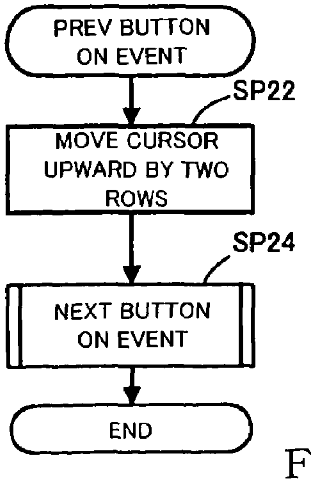

5.1.2. Depression Event of PREV button 232:

Once the PREV button 232 is depressed with the event list editing screen (FIG. 3) displayed, a PREV button ON event process routine of FIG. 5B is started up. At step SP22, the cursor 118 is moved upward by two rows. At next step SP24, the NEXT button ON event process routine of FIG. 5A is called.

Once the PREV button 232 is depressed, for example, under the conditions of FIG. 3, the cursor 118 is moved to the row of sequence number "002" two rows above the so-far cursor-indicated row, at step SP22. Then, the event set of the new or moved-to row is executed at step SP2, after which the cursor 118 is moved to the row of sequence number "003" at step SP4. Because the event set in the row of sequence number "003" is of the "time code type", this cursor-indicated row is displayed in normal "non-blinking black letters".

Figure 6A:
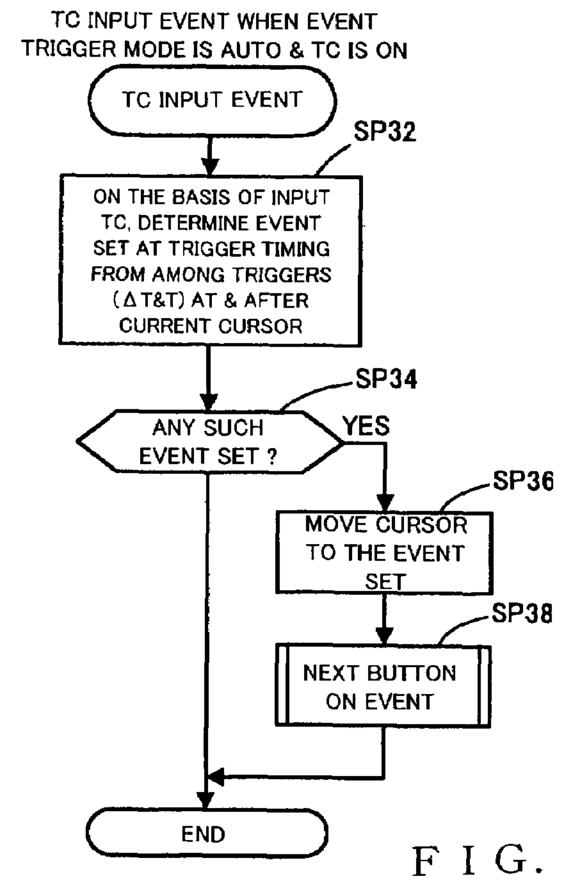
FIGS. 6A and 6B are flow charts of interrupt event process routines performed on the basis of time codes.

5.1.3. Time Code Input Event:

It is assumed that, in the instant embodiment, the above-mentioned internal and external time codes are both updated by the hundredth of second. When the event trigger mode is "auto" and the time code is ON, an interrupt is generated each time the time code is updated so that a time code input event process routine of FIG. 6A is started up.

At step SP32 of the time code input event process routine, a search is made, through the event sets of the current cursor-indicated row and rows following the cursor-indicated row in the event list 110, for a particular event set whose estimated execution time is equal to the current time code value. Here, the "estimated execution time" is a time value set for each of the event sets of the "time code type" or "after type", and, for the event set of the "time code type", the "time data" included in the event set itself is used as the estimated execution time. Therefore, the estimated execution time of the "time code type" event set is known from the beginning or in advance.

The estimated execution time of the "after type" event set, however, is a result of addition (sum) between the execution time of another event set having an execution position (turn) immediately preceding that of "after type" event set in the execution sequence (such another event set will hereinafter be referred to as "depending-from event set") and the value of the "time data". Therefore, the estimated execution time of the "after type" event set is determined when the depending-from event set, having an execution position (turn) immediately preceding that of "after type" event set, has been actually executed.

At step SP34 following step SP32, a determination is made as to whether there is any event set whose estimated execution time is equal to the current time code value. If a NO determination is made at step SP34, the time code input event process routine is brought to an end immediately without performing any further operation. If, on the other hand, a YES determination is made at step SP34, the process moves on to step SP36, where the cursor 118 is moved to the row pertaining to the event set whose estimated execution time has been determined to be equal to the current time code value. At next step SP38, the NEXT button ON event process routine of FIG. 5A is called. Thus, the event set in the current cursor-indicated row is executed at step SP2, and the cursor 118 is moved downward by one row at step SP4.

5.1.4. Back Time Code (BTC) Input Event:

Once the time code is set to the OFF state via the TC ON/OFF button 142 and the event trigger mode is set to "auto" via the EVENT TRIGGER button 134, back (backward) time codes, which are not clearly identifiable by (i.e., transparent to) the human operator, are generated. The back time code is updated by the hundredth of second similarly to the above-mentioned normal time code. Once the backward time code is updated, the BTC input event process routine of FIG. 6B is called.

Figure 6B:
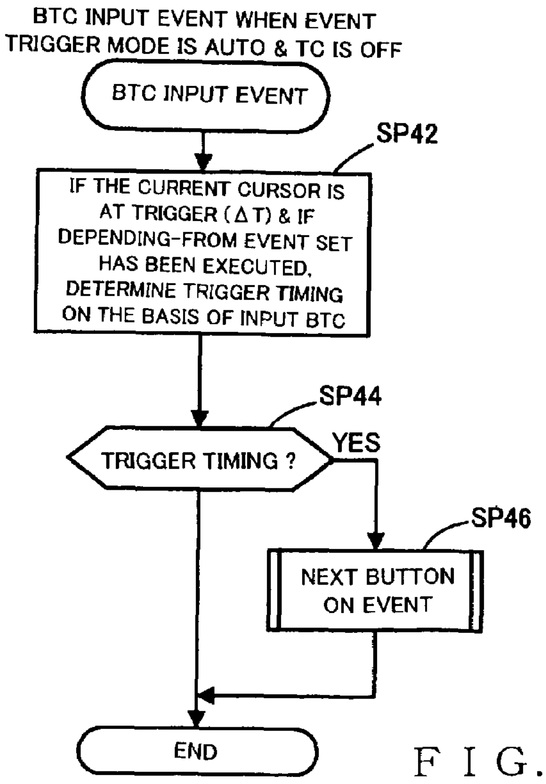

At step SP42 of the BTC input event process routine of FIG. 6B, it is determined whether the estimated execution time of the event set in the current cursor-indicated row of the event list 110 is equal to the current back time code value. In the instant process routine, however, the "estimated execution time" is defined only for the event set of the current cursor-indicated row in the case where the event set of the current cursor-indicated row is of the "after type" and when the depending-from event set has been executed. Namely, the estimated execution time of the event set in question is a result of addition (sum) between the execution time of the back time code of the depending-from event set and the "time data" of the event set in question.

At next step SP44, a determination is made as to whether the estimated execution time of the event set in question is equal to the current back time code value. With a NO determination at step SP44, the instant routine is brought to an end immediately without performing any further substantive operation. Note that, if the event set of the current cursor-indicated row is of the "time code type" or "manual type", a NO determination is always made at step SP44. If, on the other hand, a YES determination is made at step SP44, the process goes to step SP46, where the NEXT button ON event process routine of FIG. 5A is called. Thus, the event set in the current cursor-indicated row is executed at step SP2, and the cursor 118 is moved downward by one row at step SP4.

5.2. Summation of Sequence Data Reproduction Processing:

The following paragraphs summarize the behavior of the instant embodiment of the digital mixer in reproducing the sequence data.

FIG. 7 is a table indicating whether various processes are carried out or not carried out in response to various combinations of the auto/manual event trigger modes and ON/OFF states of the time code. In the table of FIG. 7, "○" indicates that the process in question is carried out, while "X>" indicates that the process in question is not carried out. In the table of FIG. 7, a "TC Recall" section indicates whether or not the "time code type" event set is automatically executed. As set forth above, the time code input event process routine of FIG. 6A is carried out only when the event trigger mode is "auto" and the time code is in the ON state; thus, the "time code type" event set is automatically carried out under such conditions.

Further, an "After Recall" section of FIG. 7 indicates whether or not the "after type" event set is automatically executed. As set forth above, the "after type" event set is also executed in the time code input event process routine of FIG. 6A; thus, the event set in question is executed when the event trigger mode is "auto" and the time code is in the ON state. Further, as explained above in relation to the BTC input event process routine of FIG. 6B, the event set in question is executed even when the time code is in the OFF state. Namely, the "after type" event set is executed if the event trigger mode is "auto", irrespective of the ON/OFF state of the time code.

Further, a "Selective Movement on List" section of FIG. 7 indicates whether or not the cursor 118 is moved automatically on the event list 110. If the time code is in the ON state as illustrated, the cursor 118 is moved on the event list 110 irrespective of the ON/OFF state of the time code. When the event trigger mode is "manual" and if the human operator has operated none of the MANUAL TRIGGER button 120, NEXT button 230 and PREV button 232, the cursor 118 is moved from the top to the bottom of the event list 110 without any event set being executed. However, as noted above, if any event set has been executed through operation of any of the buttons 120, 230 and 232, the "after type" event set depending from the executed event set is also executed.

Further, a "Manual Recall" section indicates whether or not manual scene recall is possible through operation of any of the buttons 120, 230 and 232. As illustrated in FIG. 7, such manual scene recall is always possible irrespective of the states of the event trigger and time codes.

Figure 8:
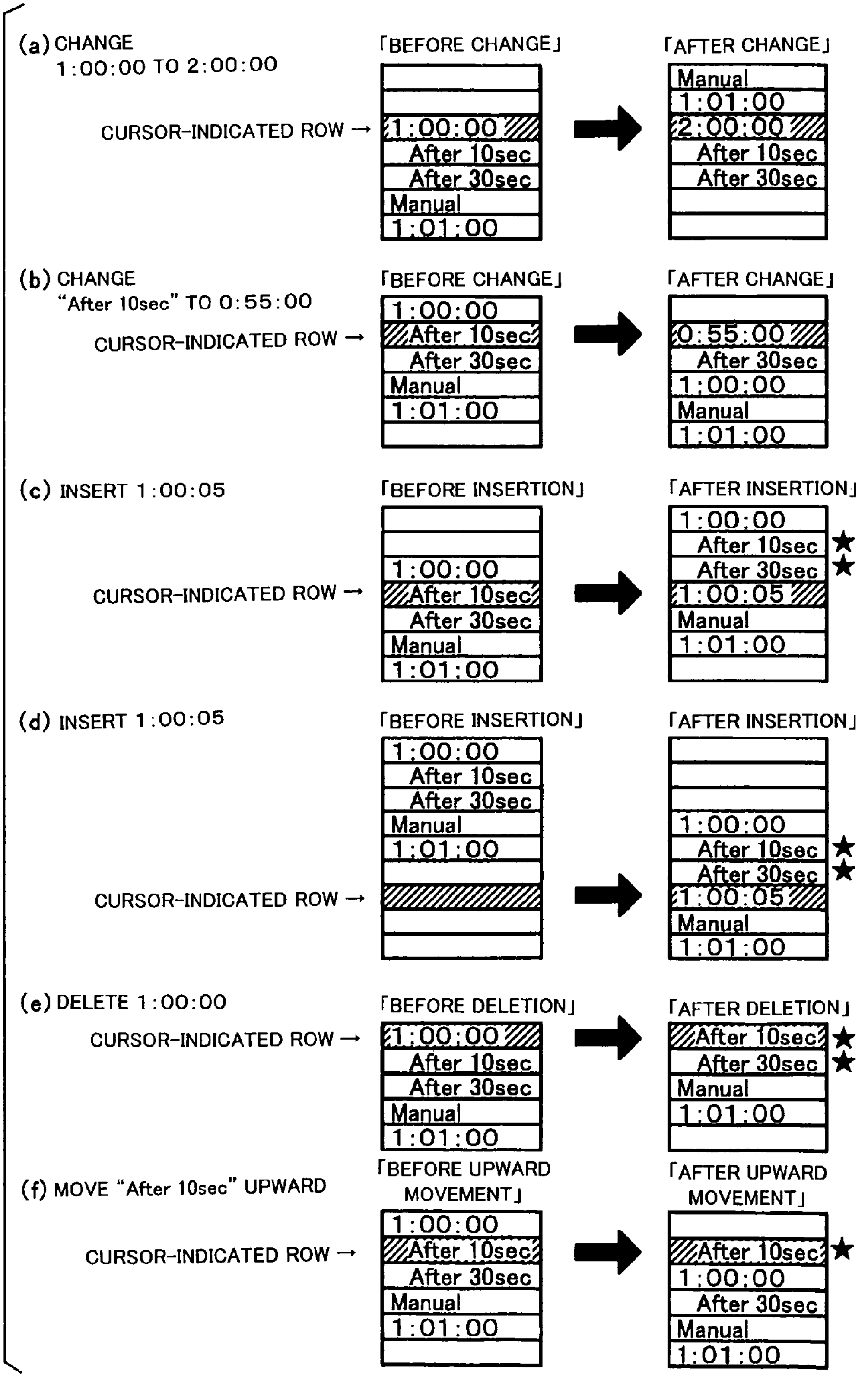
FIG. 8 is a diagram explanatory of behavior of the digital mixer when an event list is edited.

5.3. Editing of Event List 110:

Next, behavior when the event list 110 has been edited by the human operator, with reference to (a)-(f) of FIG. 8. In the illustrated example of FIG. 8, the time code is expressed briefly in the "hour: minute: second" format. First, in section (a) of FIG. 8, the event set in the cursor-indicated row is of the time code type (1:00:00), from which an "after type (10 sec)" event set depends. From the "after type" event set, another "after type (30 sec)" event set depends. The "after type (30 sec)" event is followed by "manual type" and "time code type (1:01:00)" event sets.

Once the human operator edits or changes the time data of the event set in the cursor-indicated row, the position of the cursor-indicated row is changed on the basis of the changed time code and any of the following conditions. Namely, in accordance with the editing of time data of a desired event set, the execution sequence of the event sets in the event list 110 is rearranged and accordingly the execution position of the desired event set in the event list 110 may be changed.

(Case 1) where there is no other "time code type" event set having a time code earlier than the changed time: in this case, the execution position (turn) of the event set in the cursor-indicated row is moved to the head of the event list.

(Case 2) where there is another "time code type" event set A having a time code earlier than the changed time, but there is no other event set depending from the event set A: in this case, the execution position of the event set in the cursor-indicated row is moved to a row immediately following the event set A.

(Case 3) where there is another "time code type" event set A having a time code earlier than the changed time and there are one or more other event sets B depending from the event set A: in this case, the execution position of the event set in the cursor-indicated row is moved to a row immediately following the one or more event sets B. Note that the "other event sets B depending from the event set A" include not only an "event set depending directly from the event set A" but also an "event set depending on an event set that depends from the event set A".

In the illustrated example of section (a) of FIG. 8, where the time code of the event set in the cursor-indicated row has been changed to "2:00:00", there is a "time code type" event set having a time code "1:01:00" earlier than the changed time. Naturally, there is no "after type" event set depending from the "time code type" event set. Thus, this operation falls under "Case 2" above, so that the event set in the cursor-indicated row and an event set depending therefrom are moved to a row immediately following the "time code type (1:01:00)" event set.

In the illustrated example of section (b) of FIG. 8, where the sequence data before a change is similar to that of section (a) of FIG. 8, the event set in the cursor-indicated row is of the "after type (10 sec)". If the event set in the cursor-indicated row is changed by the human operator to the "time code type (0:55:00)", the operation falls under "Case 1" above because there is no other "time code type" event set having a time data value earlier than the changed time, so that the event set in the cursor-indicated row is moved to the head of the event list. Further, an "after type (30 sec)" event set having so far depended from the event set in the cursor-indicated row is moved to the second row from the head of the event list in accordance with the movement of the cursor-indicated row.

In the illustrated example of section (c) of FIG. 8, where the sequence data before a change is similar to that of section (a) of FIG. 8, the cursor is located on an "after type (10 sec)" event set. If the INSERT button 124 has been operated, or if the RECALL button 214 has been operated with the CAPTURE button 122 in the ON state, a new "time code type" event set is inserted. Assuming that the time code at that time point, i.e. the time data of the inserted event set, is "1:00:05", this operation falls under "Case 3" above, so that the cursor-indicated row is moved to a row immediately following an "after type (30 sec)" event set.

Because, in this instance, the "time code type (1:00:05)" event set is executed about five seconds after completion of execution of a "time code type (1:00:00)" event set, the "after type (10 sec)" event set and "after type (30 sec)" event set will not be executed, and thus these two "after type" event sets are displayed in non-blinking red letters as depicted in the figure by star sings (★).

In the illustrated example of section (d) of FIG. 8, where the sequence data before a change is similar to that of section (a) of FIG. 8, the cursor is located on an "undefined row" below the last event set. If the INSERT button 124, OVERRIGHT button 126 or the like has been operated, or if the RECALL button 214 has been operated with the CAPTURE button 122 in the ON state, a new event set based on the current time code is inserted into the sequence data and the cursor-indicated row is moved to a row immediately following an "after type (30 sec)" event set, as in the example of section (c) of FIG. 8.

In the illustrated example of section (e) of FIG. 8, where the sequence data before a change is similar to that of section (a) of FIG. 8, the cursor is located on a "time code type (1:01:00)" event set. If, in this instance, the cursor-indicated row is deleted via the DELETE button 130, the cursor 118 is moved to the position of an "after type (10 sec)" event set. Because there is no event set from which the "after type (10 sec)" event set depends, the event set in question will not be automatically executed; therefore, an "after type (30 sec)" event set, depending from the "after type (10 sec)" event set, will also not be automatically executed. Thus, these two "after type" event sets are displayed in non-blinking red letters.

In the illustrated example of section (D of FIG. 8, where the sequence data before a change is similar to that of section (a) of FIG. 8, the cursor is located on an "after type (10 sec)" event set. If, in this instance, the UP button 102 is clicked via the mouse, the cursor-indicated row is moved from immediately below a "time code type (1:01:00)" event set to a row immediate above the "time code type (1:01:00)" event set. This instance is characterized in that an "after type (30 sec)" event set, having so far depended from an "after type (10 sec)" event set is not moved in accordance with the movement of the "after type (10 sec)" event set. Namely, the depending-from event set of the "after type (30 sec)" event set is changed to the "time code type (1:01:00)" event set from which the "after type (10 sec)" event set previously depended before the UP operation. Namely, after the UP operation, the "after type (10 sec)" event set in the cursor-indicated row does not depend from any other event set and is not automatically executed, so that it is displayed in non-blinking red letters.

6. Modification

The present invention is not limited to the above-described embodiment, and various modifications of the present invention are also possible as exemplified below.

(1) Whereas the embodiment has been described above in relation to the case where the present invention is applied to a digital mixer, the present invention is not so limited and may be applied to analog mixers and other apparatus that execute various events on the basis of sequence data.

(2) Whereas the embodiment has been described as performing various event processes via software programs running under the control of the CPU 10, such programs may be stored and distributed in recording media, such as a CD-ROM, flexible disk and the like, or distributed through communication channels.

What is claimed is:

1. An electronic apparatus comprising:

an event data reproducing apparatus for reproducing event data;

a current memory that stores a set of parameters;

a control section that controls a current state of said electronic apparatus in accordance with the parameters stored in said current memory;

a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, wherein said event data reproducing apparatus comprises:

a sequence data supply section that supplies sequence data including a plurality of event sets with an execution sequence of the event sets predefined, each of the event sets including the event data indicative of an event to be executed and trigger data defining timing for executing the event;

a processing section that sequentially reproduces the event data of individual ones of the event sets, included in the sequence data, in accordance with the timing defined by the trigger data corresponding to the event data, said trigger data defining timing for automatically reproducing the event corresponding thereto;

an index section that indexes the event set of an execution position immediately following an execution position of event data last reproduced by said processing section;

an operation section operable by a user to perform progression instructing operation; and a control section that, in response to the progression instructing operation performed via said operation section, causes processing by said processing section to proceed so as to reproduce the event data of the event set currently indexed by said index section; and wherein, upon arrival of earlier one of the timing defined by the trigger data of the event set currently indexed by said index section and the timing defined by the trigger data of the event set having an execution position following the execution position of the event set currently indexed by said index section, said processing section reproduces the event data of the event set corresponding to the earlier timing having arrived.

2. The electronic apparatus as claimed in claim 1 wherein said event data reproducing apparatus further comprises a backward-proceeding operation section operable by the user to perform backward-proceeding instructing operation; and a control section that, in response to the backward-proceeding instructing operation performed by the user via said backward-proceeding operation section, causes the processing by said processing section to proceed backward so as to reproduce the event set of a second preceding execution position from the execution position of the event set currently indexed by said index section.

3. The electronic apparatus as claimed in claim 1 wherein said processing section determines, with reference to a time code indicative of a progression of time, whether or not the timing defined by the trigger data has arrived, and wherein said event data reproducing apparatus further comprises an ON/OFF operation section operable by the user to set ON/OFF of the time code.

4. The electronic apparatus as claimed in claim 1 wherein the trigger data of the event sets include trigger data of a first type that defines the timing for executing the event corresponding thereto, and trigger data of a second type that indicates that the event corresponding thereto is to be executed in response to manual execution-instructing operation by the user, wherein, when the trigger data of the event set currently indexed by said index section is of said first type, said processing section automatically reproduces the event data of the indexed event set upon arrival of the timing defined by the trigger data of the indexed event set, but, when the trigger data of the event set currently indexed by said index section is of said second type, said processing section reproduces the event data of the indexed event set in response to the manual execution-instructing operation performed by the user, and wherein said control section causes the processing by said processing section to proceed so as to reproduce the event data of the event set currently indexed by said index section, in response to the progression instructing operation performed by the user, irrespective of whether the trigger data of the indexed event set is of said first type or said second type.

5. The electronic apparatus as claimed in claim 4 wherein predetermined attention-calling information is given to the user when the trigger data of the event set currently indexed by said index section is of said second type.

6. The electronic apparatus as claimed in claim 1 wherein said index section visibly displays information indicative of the event set of the immediately-following execution position.

7. The electronic apparatus as claimed in claim 1 which is used for an audio mixer apparatus, and wherein the event data in the sequence data include mixer setting data.

8. A computer-implemented method of reproducing event data in an electronic apparatus, said electronic apparatus comprising a current memory that stores a set of parameters; a control section that controls a current state of said electronic apparatus in accordance with the parameters stores in said current memory; a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, said method comprising:

a step of supplying sequence data including a plurality of event sets with an execution sequence of the event sets predefined, each of the event sets including the event data indicative of an event to be executed and trigger data defining timing for executing the event;

a processing step of sequentially reproducing the event data of individual ones of the event sets, included in the sequence data, in accordance with the timing defined by the trigger data corresponding to the event data, said trigger data defining timing for automatically reproducing the event corresponding thereto;

a step of indexing the event set of an execution position following an execution position of the event data last reproduced by said processing step; and a step of, in response to predetermined progression instructing operation performed by a user, causing processing by said processing step to proceed so as to reproduce the event data of the event set currently indexed by said step of indexing, wherein, upon arrival of earlier one of the timing defined by the trigger data of the event set currently indexed by said step of indexing and the timing defined by the trigger data of the event set having an execution position following the execution position of the event set currently indexed by said step of indexing, said processing step reproduces the event data of the event set corresponding to the earlier timing having arrived.

9. A computer readable storage medium storing a computer program for causing a computer to perform a method of reproducing event data in an electronic apparatus, said electronic apparatus including a current memory that stores a set of parameters; a control section that controls a current state of said electronic apparatus in accordance with the parameters stored in said current memory; a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, said method comprising:

a step of supplying sequence data including a plurality of event sets with an execution sequence of the event sets predefined, each of the event sets including the event data indicative of an event to be executed and trigger data defining timing for executing the event;

execution a processing step of sequentially reproducing the event data of individual ones of the event sets, included in the sequence data, in accordance with the timing defined by the trigger data corresponding to the event data, said trigger data defining timing for automatically reproducing the event corresponding thereto;

a step of indexing the event set of an execution position following an execution position of the event data last reproduced by said processing step; and a step of, in response to predetermined progression instructing operation performed by a user, causing processing by said processing step to proceed so as to reproduce the event data of the event set currently indexed by said step of indexing, wherein, upon arrival of earlier one of the timing defined by the trigger data of the event set currently indexed by said step of indexing and the timing defined by the trigger data of the event set having an execution position following the execution position of the event set currently indexed by said step of indexing, said processing step reproduces the event data of the event set corresponding to the earlier timing having arrived.

10. An electronic apparatus comprising:

an event data reproducing apparatus for reproducing an event data;

a current memory that stores a set of parameters;

a control section that controls a state of said electronic apparatus in accordance with the parameters stored in said current memory;

a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, wherein said event data reproducing apparatus comprises:

a sequence data supply section that supplies sequence data including a plurality of event sets with an execution sequence of the event sets predefined, each of the event sets including the event data indicative of an event to be executed and trigger data defining timing for executing the event, the trigger data of the event sets including trigger data of a first type that defines the timing for executing the event by use of absolute time information and trigger data of a second type that defines the timing for executing the event by use of relative time information indicative of a time interval between the events, the sequence data being capable of mixedly including the trigger data of said first type and said second type;

a processing section that sequentially reproduces the event data of individual ones of the event sets, included in the sequence data, in accordance with the timing defined by the trigger data corresponding to the event data; and an index section that indexes the event set of an execution position immediately following an execution position of the event data last reproduced by said processing section, and wherein, upon arrival of earlier one of the timing defined by the trigger data of the event set currently indexed by said index section and the timing defined by the trigger data of the event set having an execution position following the execution position of the event set currently indexed by said index section, said processing section reproduces the event data of the event set corresponding to the earlier timing having arrived.

11. The electronic apparatus as claimed in claim 10 wherein, when the event set including the trigger data of said second type is currently indexed by said index section, said processing section calculates, on the basis of the trigger data of said second type, an estimated time at which the indexed event set is to be executed, and executes the indexed event set upon arrival of the calculated estimated time.

12. The electronic apparatus as claimed in claim 10 wherein, when a first event set including the trigger data of said second type is currently indexed by said index section, said processing section calculates, on the basis of the trigger data of said second type, an estimated time at which said first event set is to be executed, searches for a second event set having an execution position following an execution position of said first event set but earliest among all of the event sets including the trigger data of said first type, and makes a comparison between the estimated time at which said first event set is to be executed and a time at which said second event set searched out is to be executed and thereby provides a display, related to said first event set, in a display style corresponding to a result of the comparison.

13. The electronic apparatus as claimed in claim 12 wherein, when the estimated time at which said first event set is to be executed is later than the time at which said second event set searched out is to be executed, the display style corresponding to the result of the comparison is set to a predetermined display style for calling attention of the user.

14. The electronic apparatus as claimed in claim 10 wherein said event data reproducing apparatus further comprises:

a presentation section that visually or auditorily presents, to the user, information representing contents of the event data of the event set currently indexed by said index section; and an operation section that receives predetermined instructing operation by the user, and wherein, even before arrival of the timing defined by the trigger data, said processing section reproduces said event set currently indexed by said index section, in response to reception, via said operation section, of the predetermined instructing operation.

15. The electronic apparatus as claimed in claim 10 wherein said processing section determines, with reference to a time code indicative of a progression of time, whether or not the timing defined by the trigger data has arrived, and which further comprises an ON/OFF operation section operable by the user to set ON/OFF of the time code.

16. The electronic apparatus as claimed in claim 10 wherein said event data reproducing apparatus further comprises an editing section that edits the sequence data supplied by said sequence data supply section, and wherein said second event set including the trigger data of said second type is included in the sequence data in an execution position immediately following the execution position of said first event set, and, when editing operation is performed, via said editing section, to change the execution position of said first event set, the execution position of said second event set is changed in dependence upon the changed execution position of said first event set.

17. The electronic apparatus as claimed in claim 10 which is used for an audio mixer apparatus, and wherein the event data in the sequence data include mixer setting data.

18. A computer implemented method of reproducing event data in an electronic apparatus comprising: a current memory that stores a set of parameters; a control section that controls a state of said electronic apparatus in accordance with the parameters stored in said current memory; a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, said method comprising:

a step of supplying sequence data including a plurality of event sets with an execution sequence of the event sets predefined, each of the event sets including the event data indicative of an event to be executed and trigger data defining timing for executing the event, the trigger data of the event sets including trigger data of a first type that defines the timing for executing the event by use of absolute time information and trigger data of a second type that defines the timing for executing the event by use of relative time information indicative of a time interval between the events, the sequence data being capable of mixedly including the trigger data of said first type and said second type;

a processing step of sequentially reproducing the event data of individual ones of the event sets, included in the sequence data, in accordance with the timing defined by the trigger data corresponding to the event data; and an index step of indexing the event set of an execution position immediately following an execution position of the event data last reproduced by said processing step, wherein, upon arrival of earlier one of the timing defined by the trigger data of the event set currently indexed by said index step and the timing defined by the trigger data of the event set having following the execution position of the event set currently indexed by said index step, said processing step reproduces the event data of the event set corresponding to the earlier timing having arrived.

19. A computer readable storage medium storing a computer program for causing a computer to perform a method of reproducing event data in an electronic apparatus comprising: a current memory that stores a set of parameters; a control section that controls a state of said electronic apparatus in accordance with the parameters stored in said current memory; a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, said method comprising:

a step of supplying sequence data including a plurality of event sets with an execution sequence of the event sets predefined, each of the event sets including the event data indicative of an event to be executed and trigger data defining timing for executing the event, the trigger data of the event sets including trigger data of a first type that defines the timing for executing the event by use of absolute time information and trigger data of a second type that defines the timing for executing the event by use of relative time information indicative of a time interval between the events, the sequence data being capable of mixedly including the trigger data of said first type and said second type;

a processing step of sequentially reproducing the event data of individual ones of the event sets, included in the sequence data, in accordance with the timing defined by the trigger data corresponding to the event data; and an index step of indexing the event set of an execution position immediately following an execution position of the event data last reproduced by said processing step, wherein, upon arrival of earlier one of the timing defined by the trigger data of the event set currently indexed by said index step and the timing defined by the trigger data of the event set having an execution position later than the event set currently indexed by said index step, said processing step reproduces the event set corresponding to the earlier timing having arrived.

20. An electronic apparatus comprising:

an event data reproducing apparatus for reproducing an event data;

a current memory that stores a set of parameters;

a control section that controls a state of said electronic apparatus in accordance with the parameters stored in said current memory;

a scene memory that stores a plurality of sets of parameters as a plurality of scenes; and a transfer section that transfers one scene, selected from among the plurality of scenes, from said scene memory to said current memory, the reproduced event data being data instructing said transfer section to designate and transfer the one scene, wherein said event data reproducing apparatus comprises:

a sequence data supply section that supplies sequence data including a plurality of event sets with an execution sequence of the event sets predefined, each of the event sets including the event data indicative of an event to be executed and trigger data defining timing for executing the event, the trigger data of the event sets including: trigger data of a first type that defines the timing for executing the event by use of absolute time information; and trigger data of a second type that defines the timing for executing the event by use of relative time information indicative of a time interval between the events; and trigger data of a third type that instructs that the corresponding event be executed in response to manual execution-instructing operation performed by a user, the sequence data being capable of mixedly including the trigger data of said first, second and third types;

a processing section that sequentially reproduces the event data of individual ones of the event sets, included in the sequence data, in accordance with the timing defined by the trigger data corresponding to the event data; and an index section that indexes the event set of an execution position immediately following an execution position of the event data last reproduced by said processing section, and wherein, upon arrival of earlier one of the timing defined by the trigger data of the event set currently indexed by said index section and the timing defined by the trigger data of the event set, including the trigger data of said first type, having an execution position following the event set currently indexed by said index section, said processing section reproduces the event set corresponding to the earlier timing having arrived, the timing defined by the trigger data of said third type being when the manual execution-instructing operation has been performed by the user.

21. The electronic apparatus as claimed in claim 20 wherein said event data reproducing apparatus comprises:

an event list presentation section that presents an event list for listing the plurality of event sets included in the sequence data.

22. The electronic apparatus as claimed in claim 21, wherein said event list presentation section includes a display device that visibly displays said event list for listing sequence data.

23. The electronic apparatus as claimed in claim 21, wherein said event data reproducing apparatus further comprises an editing section that edits the sequence data listed in said event list, said editing section being capable of modifying a value of said absolute or relative time information defined by said trigger data of said first or second type included in a desired event set listed in said event list, wherein, in accordance with the modification of the value of said absolute or relative time information of said desired event set via said editing section, the execution sequence of the event sets in said event list is rearranged.

24. The electronic apparatus as claimed in claim 21, wherein said event data reproducing apparatus further comprises an editing section that edits the sequence data listed in said event list, said editing section being capable of changing said relative time information defined by said trigger data of said second type included in a desired event set listed in said event list into absolute time information defined by said trigger data of said first type, or changing said absolute time information defined by said trigger data of said first type included in a desired event set listed in said event list into relative time information defined by said trigger data of said second type, wherein, in accordance with the change of the relative or absolute time information of the second or first type for said desired event set via said editing section, the execution sequence of the event sets in said event list is rearranged.

25. The electronic apparatus as claimed in claim 21, wherein said event data reproducing apparatus further comprises an editing section that edits the sequence data listed in said event list, said editing section being capable of inserting a desired event set having trigger data of the first or second type into said event list, wherein, in accordance with the insertion of the desired event set via said editing section, the execution sequence of the event sets in said event list is rearranged so that said desired event set is inserted into an execution position according to absolute or relative time information of the trigger data included in said desired event set.

26. The electronic apparatus as claimed in claim 21, wherein said event data reproducing apparatus further comprises an editing section that edits the sequence data listed in said event list, said editing section being capable of inserting a desired event set having trigger data of the third type in correspondence with a desired execution position in said event list, wherein, in accordance with the insertion of the desired event set via said editing section, the execution sequence of the event sets in said event list is rearranged so that said desired event set is inserted into the desired execution position in said event list.

27. The electronic apparatus as claimed in claim 21, wherein said event data reproducing apparatus further comprises an editing section that edits the sequence data listed in said event list, said editing section being capable of deleting a desired event set from said event list, wherein, in accordance with the deletion of the desired event set via said editing section, the execution sequence of the event sets in said event list is rearranged so that said desired event set is deleted from said event list.

28. The electronic apparatus as claimed in claim 21, wherein said event data reproducing apparatus further comprises an editing section that edits the sequence data listed in said event list, said editing section being capable of moving a desired event set in said event list, wherein, in accordance with the movement of the desired event set via said editing section, the execution sequence of the event sets in said event list is rearranged so that an execution position of said desired event set is moved in said event list.

* * * * *